(12) United States Patent
Page et al.

(10) Patent No.: US 10,484,239 B2
(45) Date of Patent: Nov. 19, 2019

(54) MANAGEMENT OF PLUGGABLE TRANSCEIVERS IN A SOFTWARE DEFINED NETWORK

(71) Applicant: Precision Optical Transceivers INC., Rochester, NY (US)

(72) Inventors: Chris Page, Brockport, NY (US); Bryce Tennant, Brockport, NY (US)

(73) Assignee: Precision Optical Transceivers Inc., Rochester, NY (US)

( * ) Notice: Subject to any disclaimer, the term of this patent is extended or adjusted under 35 U.S.C. 154(b) by 229 days.

(21) Appl. No.: 15/480,056

(22) Filed: Apr. 5, 2017

(65) Prior Publication Data

US 2018/0295021 A1 Oct. 11, 2018

(51) Int. Cl.
*H04L 12/24* (2006.01)
*H04B 10/40* (2013.01)

(52) U.S. Cl.
CPC ......... *H04L 41/0809* (2013.01); *H04B 10/40* (2013.01); *H04L 41/085* (2013.01); *H04L 41/0816* (2013.01)

(58) Field of Classification Search
None
See application file for complete search history.

(56) References Cited

U.S. PATENT DOCUMENTS

2010/0049837 A1 2/2010 Ji
2015/0256400 A1* 9/2015 Venkatesan ......... H04L 41/0886
370/255

FOREIGN PATENT DOCUMENTS

CN 103220170 A 7/2013

OTHER PUBLICATIONS

Thyagaturu, A., et al., "Software Defined Optical networks (SDONs): A Comprehensive Survey," arXiv:1511.04376v2 [cs.NI] May 26, 2016.
Thompson, C., "Open Optical Monitoring," Finisar, RIPE 73, Oct. 2016.

* cited by examiner

*Primary Examiner* — Jeffrey R Swearingen
(74) *Attorney, Agent, or Firm* — Fox Rothschild LLP; Robert J. Sacco

(57) ABSTRACT

Automatically configuring a pluggable optical transceiver (POT) in a software defined network (SDN) involves a pluggable optical transceiver configuration management application (POT-CMA) executing in a processing device disposed in an application plane of the SDN. The POT-CMA receives first configuration information of a POT which has been inserted into a network device in an SDN data plane. Responsive to receiving the data, the POT-CMA automatically determines at least one modification or addition to the first configuration information to facilitate use of the POT within the SDN in the first port of the first network device. Thereafter, the POT CMA causes at least one write event to occur at the first network device wherein the at least one modification or addition is written to a memory in the POT.

22 Claims, 7 Drawing Sheets

US 10,484,239 B2

MANAGEMENT OF PLUGGABLE TRANSCEIVERS IN A SOFTWARE DEFINED NETWORK

BACKGROUND

Statement of the Technical Field

The technical field of this disclosure comprises data networks, and more particularly methods and systems for managing pluggable transceivers in a software defined data network.

Description of the Related Art

Optical data networks use transceivers to interface network devices to fiber optic cables. Such transceivers include a transmitter which receives an electrical input and converts it to an optical output which can be coupled into an optical fiber. The transceiver also includes a receiver. The receiver is comprised of a detector for converting light received from an optical fiber into an electrical signal, and electronic interface circuitry which conditions the electrical signal for use by the network device. Transceivers as described are usually packaged in an industry standard configuration which includes a standard electrical interface on one end from which it receives power and communicates data. It also includes an optical interface on an opposing end for transmitting and receiving data. These packages are commonly described as pluggable insofar as they can be simply plugged into the network equipment that they support.

SUMMARY

Embodiments concern a method for automatically configuring a pluggable optical transceiver (POT) in a software defined network (SDN). The method involves a pluggable optical transceiver configuration management application (POT-CMA) executing in at least one processing device disposed in an application plane of the SDN. The POT-CMA receives data, which comprises first configuration information accessed from a memory location within a POT which has been inserted into a first port of a first network device of a plurality of network devices in an SDN data plane. Responsive to receiving the data, the POT-CMA automatically determines at least one modification or addition to the first configuration information to facilitate use of the POT within the SDN in the first port of the first network device. Thereafter, the POT CMA causes at least one write event to occur at the first network device wherein the at least one modification or addition is written to a memory in the POT to define a second configuration information different from the first configuration information.

Embodiments also concern a software defined network (SDN) in which at least one processing device disposed in an application plane of the SDN executes a pluggable optical transceiver configuration management application (POT-CMA). The SDN includes an SDN controller disposed in a controller plane of the SDN network and an SDN data plane. The SDN data plane is comprised of a plurality of network devices, each facilitating optical communications in the SDN using at least one pluggable optical transceiver (POT). The at least one processing device is configured to receive from the SDN controller data comprising first configuration information accessed from an internal memory of a POT, which has been inserted into a first port of a first network device of the plurality of network devices. The POT-CMA is further configures so that in response to receiving the data, it automatically determines at least one modification or addition to the first configuration information to facilitate use of the POT in the first network device. Thereafter, the POT-CMA causes at least one write event at the first network device wherein the at least one modification or addition is written to a memory in the POT to define a second configuration information different from the first configuration information.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

A conventional Software-Defined Network (SDN) can allow administrators to programmatically initialize, control, change and manage network. This is accomplished in a SDN by decoupling the control plane from the underlying infrastructure that forwards data traffic to the selected destination. Consequently, many computer network operators are using or migrating to SDNs and many of these network operators already control their entire network down to their switches. Still, conventional SDNs facilitate little control over optical transceivers that are disposed in or utilized by the network equipment. Better management of optical transceivers in SDNs has the potential to benefit SDN operators and network equipment manufacturers who are deploying network equipment. Accordingly, there is disclosed herein is an automated software system for managing a plurality of optical transceivers which are used to facilitate data communications in a computer network.

Figure 1:
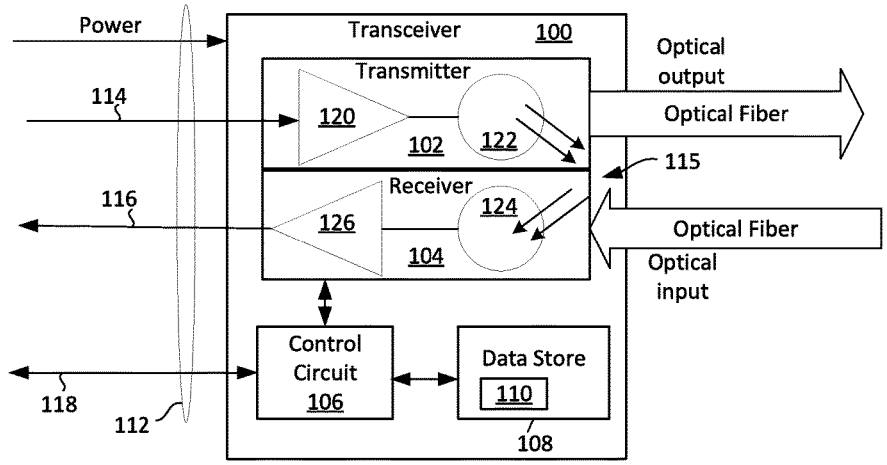
FIG. 1 is a block diagram that is useful for understanding a pluggable optical transceiver.

Optical transceivers are widely used in networking equipment for communicating data through optical fiber. Accordingly, the SDN paradigm has been extended to include networks of this kind, which are sometimes referred to as Software Defined Optical Networks SDON). As shown in FIG. 1, a conventional optical transceiver 100 includes a transmitter 102 which receives data traffic 114 in the form of electronic data signals and converts it to an optical output which can be coupled into an optical fiber. The transmitter is comprised of electronic interface circuitry 120 and an optical source 122 capable of modulating an optical signal onto an optical fiber. The transceiver will also include a receiver 104. The receiver 104 is comprised of a detector 124 for converting light received from an optical fiber into an electrical signal, and electronic interface circuitry 126 which conditions the electrical signal for use by the network device. The electrical signal output from the interface circuitry 126 is comprised of electronic data traffic 116. The optical transceiver also includes a control circuit 106 such as a microcontroller or central processing unit (CPU) for controlling the operations of the transmitter 102 and receiver 104. In some scenarios, certain processing operations associated with the electronic interface circuitry 120, 126 can be performed at least in part by the control circuit 106. The control circuit also facilitates certain monitoring and control functions of the optical transceiver.

Optical transceivers as shown in FIG. 1 are conventionally packaged in an industry standard configuration which includes a standard electrical interface 112 on one end from which it receives power and communicates electronic data traffic 114, 116. The electrical interface 112 also facilitates communication of certain monitoring and control information 118. An optical transceiver 100 will include an optical interface on an opposing end for optically transmitting and receiving data. Optical transceiver packages as described herein are commonly described as pluggable insofar as they can be simply plugged into the network equipment that they support. Optical transceivers in this configuration are referred to herein as Pluggable Optical Transceivers or POTs.

The form factor and electrical interface of POTs are typically specified by a multi-source agreement (MSA) among a committee of network component vendors. For example and without limitation, POTs as described herein can conform to the SFP (small form-factor pluggable) standard, SFP+, CSFP (compact SFP), QSFP (quad SFP) or the XFP (10 Gigabit small form factor pluggable) standard which comprises a slightly larger form factor as compared to SFP. Typical network applications for POTs can include 10 Gigabit Ethernet, 10 Gbit/s Fiber Channel, synchronous optical networking (SONET) at OC-192 rates, synchronous optical networking STM-64, 10 Gbit/s Optical Transport Network (OTN) OTU-2, and parallel optics links.

Conventional POTs will usually contain various types of configuration information that are defined by the MSA and by vendor specific encodings. The configuration information for a POT is usually comprised of a plurality of configuration parameter values which define certain operational characteristics of the POT. This set of configuration parameter values is sometimes collectively referred to herein as a POT configuration. The configuration information 110 is usually stored in a data storage device 110. A data storage device 110 used for this purpose can be an electronically erasable programmable read-only memory (EEPROM).

The configuration information stored in the POT will vary somewhat depending on the POT manufacturer, the way the device is being used in a particular network port, the characteristics of the fiber optic network to which it is connected, and so on. However, for purposes of the embodiments described herein, the configuration information stored in the EEPROM will generally include at least the following broad categories: (1) operational configuration data, (2) operational alarm/warning thresholds, (3) vendor general information and (4) vendor specific information.

Items (1), (2) and (3) are defined by the MSA. The operational configuration data will include various information such as transceiver type identifiers, optical and electrical compatibility information, the encoding algorithm, data rate, fiber length/type support, wavelength/tuning information, and diagnostic capabilities. The operational alarm/warning thresholds can include alarm and warning thresholds for diagnostic information including RX/TX power, temperature, voltage, and current. The vendor general information is comprised of information concerning the vendor name, vendor Organizational Unique Identifier (OUI), part number, serial number, revision, and date code. There is no specific standard which specifies what types of information can be included in the vendor specific information. As such, the vendor specific information can comprise different types of data for each network device manufacturer.

A particular POT configuration can be unique per combination of transceiver, network equipment, and software version that is running on the network equipment. Further, it is not uncommon for multiple different configurations to utilize the same base transceiver hardware. Given the multitude of possible configurations which can be applied to POTs, network operators often choose to purchase POTs from the original manufacturer of the network equipment. This approach is perceived as having the advantage of ensuring that the POT is properly configured and matched with particular pieces of equipment offered for sale by that manufacturer. The POTs are also sometimes purchased through third party POT manufacturers that have knowledge concerning how to configure the POT to match the particular type of network equipment it will be used in.

The configuration and programming of POTs as described herein is commonly managed through different part numbers. While this approach can be helpful to keep track of all the different possible configurations, it nevertheless requires network operators to have the capability to understand, purchase and manage the multitude of pre-configured variations for all of their network equipment. Some equipment manufacturers offer standalone hardware/software programming devices that allow network operators to configure their POTs. But these devices require users to have the knowledge and experience of configuring the POTs properly based on the environment they will be used in.

From the foregoing it will be appreciated that the conventional approach to managing POTs is basically a manual process. Network engineers/technicians must identify and purchase properly configured products. Once purchased, these same network engineers and/or technicians must carefully manage the utilization of the pluggable optical transceivers in network equipment. This process can be cumbersome and prone to error.

Accordingly, there is disclosed herein an automated system for managing a plurality of optical transceivers, and especially POTs, which are used to facilitate optical data communications in a SDON. The disclosed system utilizes a centralized set of POT configurations to manage a plurality of POTs which are connected to or plugged into any of the equipment comprising such network. In some embodiments, the centralized set of POT configurations can include POT configurations for the entire network. The system can advantageously detect when a POT has been connected to or plugged into any piece of network equipment. Once detected, the system automatically configures the POT with the proper operating information for the network equipment, infrastructure, and end-user requirements. Further, the system can handle instant notification of errors if compatibility problems exist. In some embodiments, the system can manage POT information for all POTs that are included as part of the software defined network. Further, the system can advantageously include a computer user interface (such as a graphical user interface or GUI) to monitor and manage the system.

Figure 2:
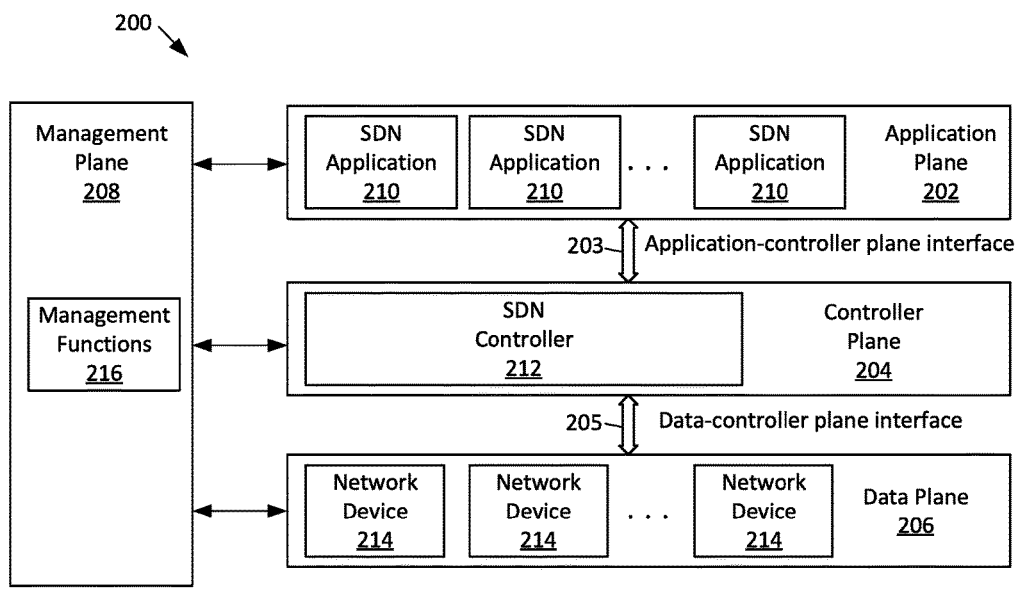
FIG. 2 is a software architecture block diagram that is useful for understanding certain basic features of a Software Defined Network (SDN) in which a pluggable optical transceiver (POT) can be used for communicating data.

Embodiments of a POT management system as disclosed are best understood with reference to a high level view of a Software Defined Network (SDN) architecture as shown in FIG. 2. A complete description of the SDN architecture is beyond the scope of this disclosure. However, the basic features of a SDN architecture is considered to be well known in the art. For example, details concerning an SDN architecture are disclosed in a document entitled "Software Defined Optical Networks (SDONs): A Comprehensive Survey," in *IEEE Communications Surveys & Tutorials*, vol. 18, no. 4, pp. 2738-2786, Fourthquarter 2016. Accordingly, only a brief overview description of an SDN architecture is provided here to facilitate an understanding of the various embodiments. Further, it should be understood that any references to a SDN throughout this document are intended to also include an SDON which uses optical means for communicating data at the physical layer.

The SDN architecture 200 can be understood as comprising three layers, which include an application plane 202, a controller plane 204, and data plane 206 (which is also sometimes referred to as an infrastructure plane). The data plane 206 is comprised of a plurality of network devices 214. The data plane 206 facilitates data transfer to and from clients (not shown). As such, the data plane 206 can facilitate transportation of data pertaining to multiple user transport sessions involving multiple protocols. The data plane will also manage these data transport sessions with remote peers. Each network device 214 can instantiate one or more SDN datapaths 320. Each SDN datapath comprises a logical network device that exposes data forwarding and data processing functionality provided by a forwarding/processing engine 330. Exemplary network devices 214 can include programmatically controlled network routers and switches.

The application plane 202 includes one or more various SDN applications 210. The SDN applications 210 can execute on a single computer server platform or on a set of distributed computer platforms. The SDN applications can also execute on one or more virtual machines in one or more data centers. In a conventional SDN architecture, the SDN applications utilize the network processing and transport functionality provided by the network devices 214 in the data plane.

A SDN controller 212 disposed in the control plane (i.e., between the application plane and the data plane) controls the transport and processing resources which are provided by the network devices 214. The SDN controller 212 will offer these data transport and processing services to the SDN applications 210. The functional processes associated with the SDN controller 212 can execute on a single computer server platform or on a set of distributed computer platforms. The SDN can also execute on one or more virtual machines in one or more data centers. As such, the SDN controller 212 can be understood as comprising a logical entity which will receive communications from the SDN applications 210 for purposes of configuring the network infrastructure based on certain requirements of the SDN applications, and will offer such data transport and processing services to the SDN applications 210.

Control over each of the network devices 214 is effected by the SDN controller 212 through a data-controller plane interface (D-CPI) 205. The D-CPI is comprised of one or more interfaces between the SDN controller 212 and the network devices 214. The D-CPI facilitates programmatic control by the SDN controller of forwarding operations implemented by the network devices. It also facilitates advertisement of data forwarding/processing capabilities which are exposed by the network devices 214. Other functions facilitated by the D-CPI can include reporting and event notification. Notably, the D-CPI is usually implemented in an open, vendor-neutral way. The D-CPI is sometimes referred to as the South-Bound Interface (SBI).

As noted above, the SDN applications will communicate their processing and transport requirements to the SDN controller. These communications between the SDN controller and the SDN applications are facilitated by an application-controller plane interface (A-CPI) 203. Communications across the A-CPI will involve queries and notifications concerning the state of the network and commands to alter its state. Commands to alter the state of the network can involve commands which create or modify network connectivity (or traffic processing functions) facilitated by the network devices 214. The A-CPI interface 203 is sometimes referred to as the North-Bound Interface (NBI).

The data transport and processing services offered to the SDN applications by the SDN controller are based on an information model instance. The model can be based on management functions 216 which reside in a management plane 208. The model applied in each case can be based on the available network resources, a predetermined data resource management policy, and other factors. The SDN controller 212 will respond to resource requests from the various SDN applications 210 and in turn will exert lower level control over the limited network resources offered by the network devices 214 in the data plane. For example, an SDN controller may manage competing demands from SDN applications 210 for limited data network resources in accordance with the information model.

Figure 3:
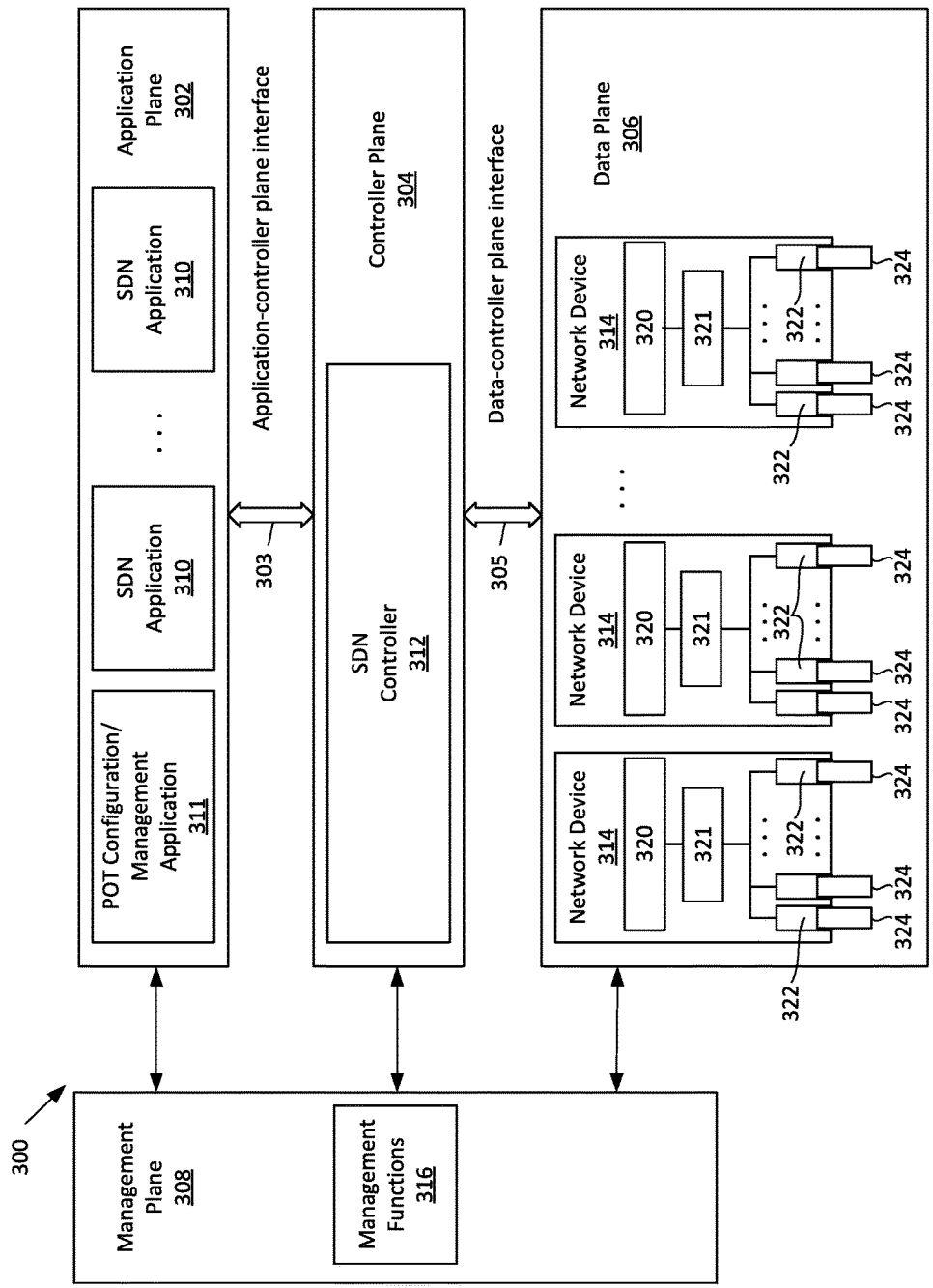
FIG. 3 is a software architecture block diagram that is useful for understanding how a POT Configuration/Management Application (POT-CMA) in an SDN can automatically configure one or more POTs when they are inserted into ports of one or more network devices.

Turning now to FIG. 3 there is shown a POT configuration and management system for configuring and managing one or more POTs in an SDN 300. The SDN 300 is similar to the SDN 200. As such, the SDN will include an application plane 302, a controller plane 304, and a data plane 306. The SDN can also include a management plane 308 in which certain management functions 316 reside for managing the operation of the application plane, controller plane and data plane.

The application plane is comprised of a plurality of SDN applications 310 which communicate with the SDN system controller 312 through an A-CPI 303 interface. The SDN 300 also includes a plurality of network devices 314 which provide processing and data transport services. These transport services are made available to the SDN applications 310 in a manner that is similar to that described above with respect to SDN 200. In an embodiment disclosed herein, the network devices comprise a plurality of physical network data ports 322 which can be used to facilitate transmitting and receiving of network data. One or more POTs 324 are removably inserted in these physical network data ports 322 to communicate data over optical fiber data transmission lines (not shown).

Figure 4:
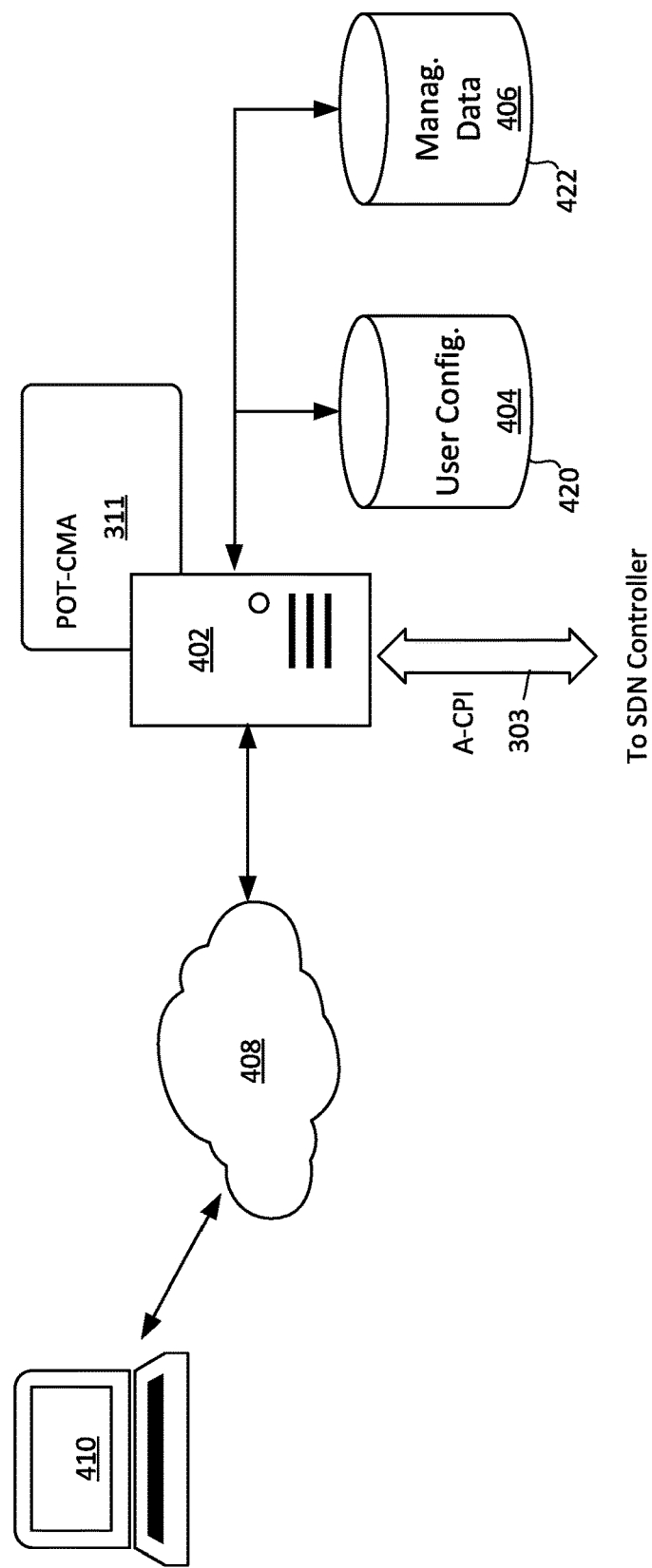
FIG. 4 is a block diagram that is useful for understanding a computer system on which a POT-CMA can be hosted.

In SDN 300 the SDN application plane 302 further includes a POT-Configuration/Management Application (POT-CMA) 311. The POT-CMA is part of a POT configuration and management system which is used for configuring and managing POTs on the SDN 300. As shown in FIG. 4 the POT-CMA 311 can be hosted on a computing device such as a computer server 402. The hosted POT-CMA 311 has access to a POT user configuration database 404 and management database 406 which are stored in one or more data storage devices 420, 422. The configuration database 404 will contain POT configuration information for each POT in accordance with the POT manufacturer, specific network device where the POT is installed, and port location within such network device. As such, the configuration database can include (1) operational configuration data, (2) operational alarm/warning thresholds, (3) vendor general information and (4) vendor specific information, as described herein.

The management database 406 will comprise a log which specifies for each installed POT within the network a base working image, final validated image, information specifying the network device/port where the POT is installed, and the programming procedure that was used to program the POT. So all relevant information concerning a particular POT and its unique configuration are accessible in the management database.

The POT-CMA can include a user interface (e.g., a web based user interface) to facilitate monitoring and management of one or more POTs. Accordingly, a POT-CMA administrator can perform configuration and management tasks from a computer system 410, which may be disposed at a location remote from the server 402. In some scenarios, such access can be facilitated by a data network 408.

The POT configuration and management system can further include a daemon 320 which executes on each network device 314. As is known, a network device 314 can comprise a computer processing system. A daemon as described herein can comprise a computer program that runs as a background process in each network device. In an embodiment, the daemon is advantageously configured to read and write configuration data for POTs using a read/write Application Programming Interface (API) which is made available in the network device for this purpose. Computer programs which are capable of reading and writing configuration data to an EEPROM in a POT are well known. Accordingly, the API provided for this purpose will not be described here in detail. However, it should be understood that a read/write API provided for this purpose does not need to have any knowledge concerning the actual configuration of the POT. Instead, the read/write API simply needs to perform read and write operations to the EEPROM in a POT when commanded to do so; and to provide such data to the daemon. The daemon will receive this raw data and cause it to be communicated to the POT-CMA 311 as described herein.

Figure 5:
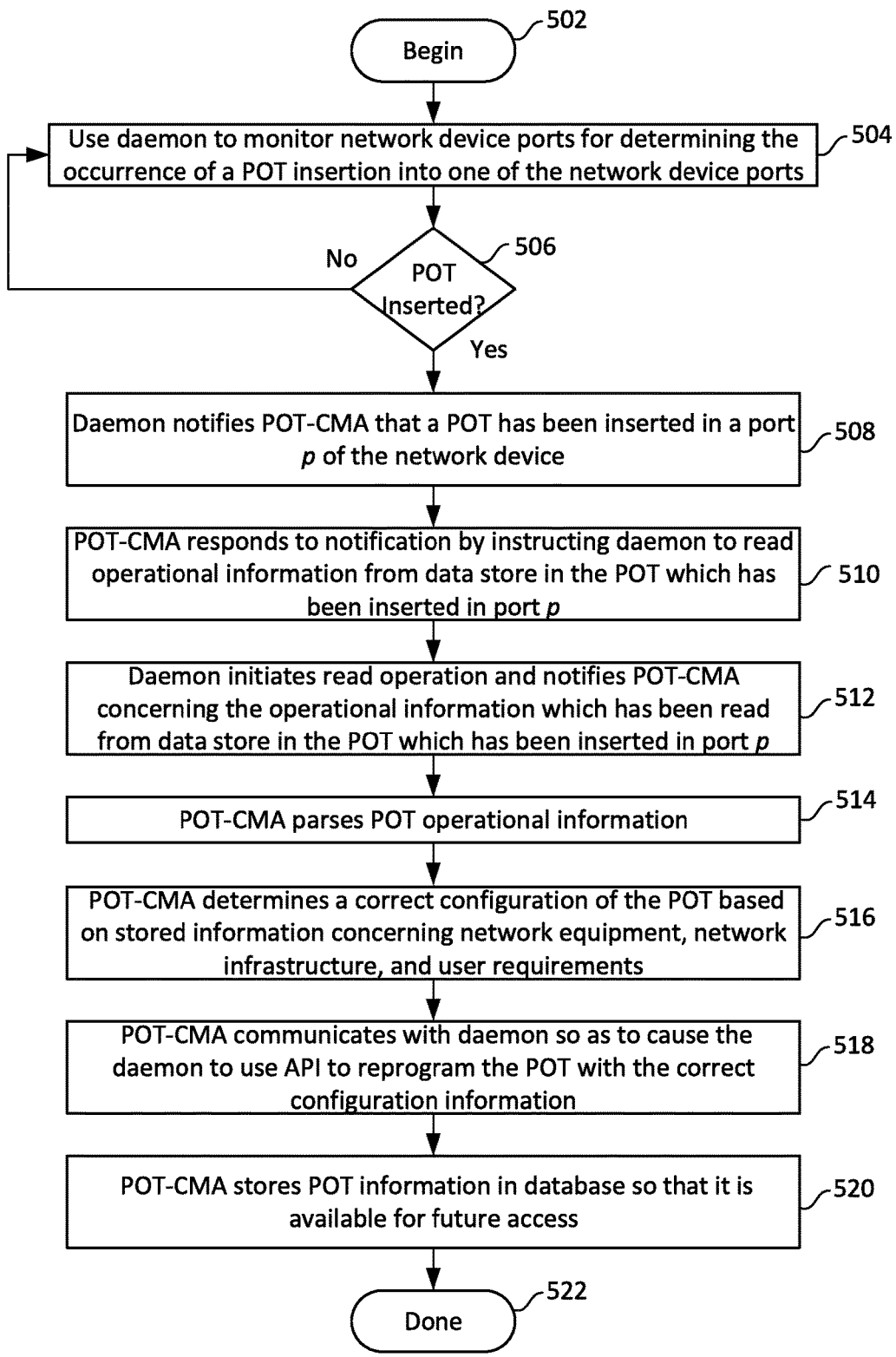
FIG. 5 is a flow-chart that is useful for understanding a process by which an SDN application residing in an application plane of an SDN can interact with processing entities in other layers of a SDN to facilitate automatic POT configuration as disclosed herein FIGS. 6A and 6B together comprise a flow chart which is useful for understanding certain detailed operations of an SDN application to facilitate automatic POT configuration.

Referring now to FIG. 5, there is shown an overview process flow in an SDN network which is useful for understanding certain embodiments disclosed herein. The process begins at 502 and continues at 504 where a daemon (e.g., daemon 320) regularly monitors one or more network device ports (e.g. network device ports 324) for purposes of determining whether a POT (e.g., a POT 324) insertion has occurred. A conventional physical network data port 322 will include a hardware element 321 which is comprised of an electronic interface circuit that is configured to communicate with a POT 324 when installed in the port 322. The daemon is configured to communicate with the hardware element 321 so as to monitor the interface which controls the POT. The monitoring can be substantially continuous so that the insertion of any POT is detected by the daemon within seconds of such occurrence.

At 506 a decision is made as to whether insertion of a POT has been detected. If no insertion of a POT has been detected (506: No), then the daemon returns to step 504 and continues monitoring the one or more network device ports. However, if the daemon does detect an occurrence of a POT insertion (506: Yes), then the process continues on to 508. At 508 the daemon notifies a POT-CMA (e.g. POT-CMA 311) that a POT has been inserted in a port p of the network device, where p specifies an identification of the port in which the POT has been inserted. In some scenarios p can be a numeric or alpha-numeric value which specifies the particular port within a network device 314. The communication to the POT-CMA can also include identifying information (e.g. a logical address) which specifies a particular one of the network devices 314 from which the communication originated. Accordingly, the POT-CMA will be informed that a particular port p of a particular network device has experienced a POT insertion event.

The process continues on to 510 where the POT-CMA responds to the notification at 508 by instructing the daemon to read the configuration information contained in the POT which has been inserted in the port p. For example, in the optical transceiver 100 shown in FIG. 1, the POT-CMA can instruct the daemon to read POT configuration information 110 which has been recorded in a data store 108. This configuration information could be existing incorrect configuration information, placeholder data, incomplete data, or generic data based on a bill of materials (BOM).

At 512, the daemon initiates the requested read operation using the read/write API. Once this step is completed, the daemon notifies the POT-CMA concerning the operational information which has been read from the data store of the POT which has been inserted in port p. Once received by the POT-CMA, the operational information data is parsed at 514. Thereafter at 516 the POT-CMA determines a correct set of configuration parameters for the POT based on stored configuration information in the configuration database 404. The correct POT configuration information for the particular POT is determined based on information concerning network equipment, POT manufacturer, network infrastructure, user requirements and so on.

POT-CMA communicates with daemon at 518 so as to cause the daemon to initiate reprogramming of the POT with the correct information, using the read/write API. In this regard the POT-CMA can communicate one or more packets of data to the daemon specifying the correct configuration information for the POT as determined at 516, and at least one write command. The write command will cause the daemon 320 to utilize the read/write API and hardware element 321 to write the correct configuration information to the POT disposed in port p. In response, the daemon will utilize the read/write API on the network device 314 to perform the write operation to the POT using the correct configuration data.

At 520, the POT-CMA can advantageously store in the management database 406 the POT configuration information which has been programmed into the POT in port p so that it is available for future access. Thereafter the process can terminate at 524 or continue with other processing.

From the foregoing it will be understood that the process described herein with respect to FIG. 5, involves several communications between the POT-CMA 311 and a daemon 320 residing in a network device 314. Communications from a daemon 320 to the POT-CMA will begin with a communication from the network device 314 to the SDN controller 312, utilizing the D-CPI 305 interface. This message will specify that the message is directed to a logical address associated with POT-CMA 311. In response, the SDN controller 312 will process the message and forward the communicated information to the POT-CMA 311 using the A-CPI 303. The messages described herein for such communications will conform to a communication protocol specified for the SDN 300. SDN messaging protocols are well known in the art and therefore will not be described here in detail. However, it should be understood that the messaging protocols for this purpose can be consistent with conventional messaging techniques used in an SDN 300 to facilitate communications between an network device 314 and a conventional SDN application 310.

In those instances when it is necessary for the POT-CMA 311 to communicate data or commands to the daemon 320, the POT-CMA will utilize the A-CPI interface to send a message to the SDN controller 312. In response, the SDN controller 312 will process the message and forward the communicated information to the daemon 320 using the D-CPI 305. These messages will also conform to a conventional communication protocol specified for the SDN 300. For example, the messaging protocols used for this purpose can be consistent with conventional messaging techniques used in an SDN 200 to facilitate communications between an SDN application 210 and a network device 214.

Figure 6A:
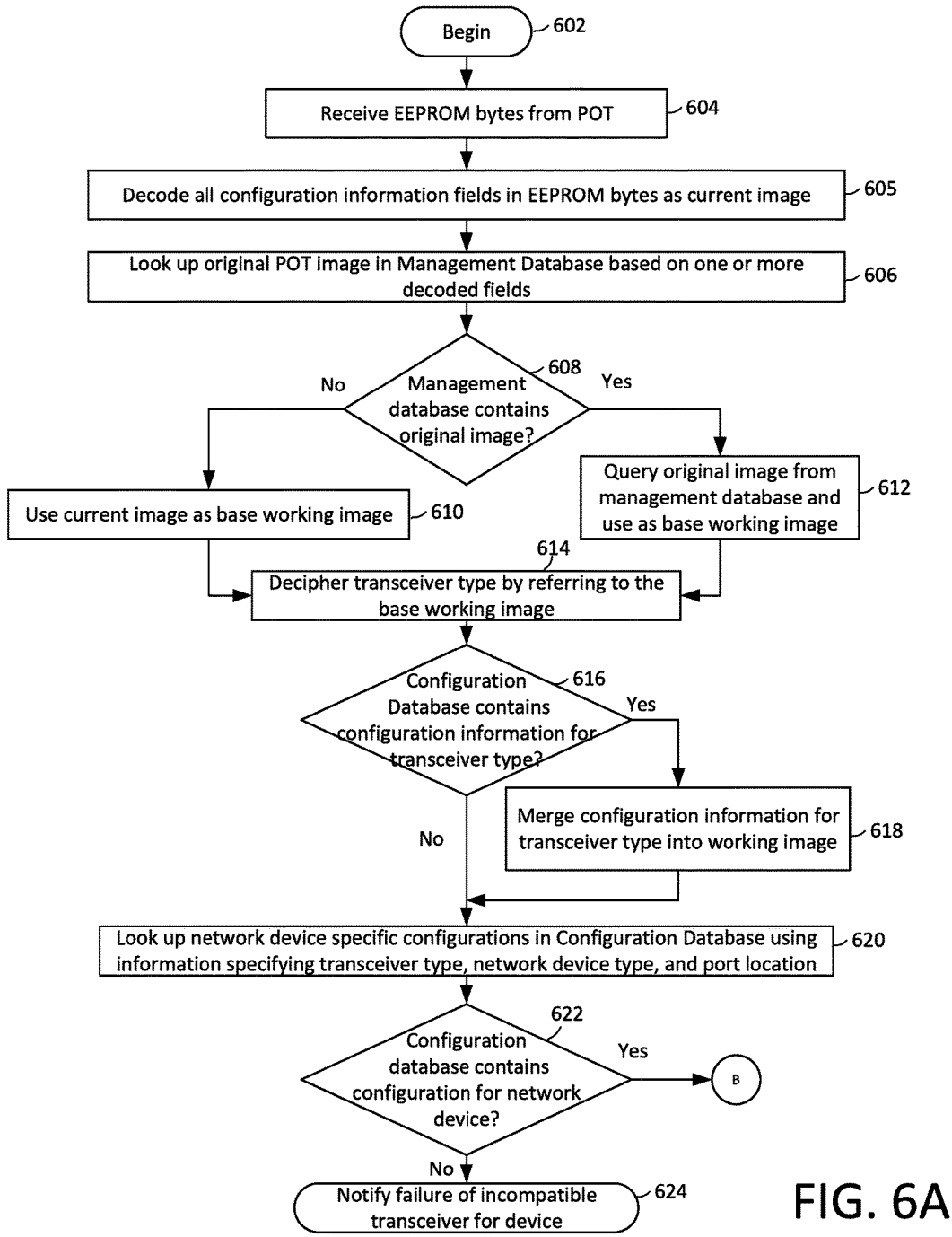
Figure 6B:
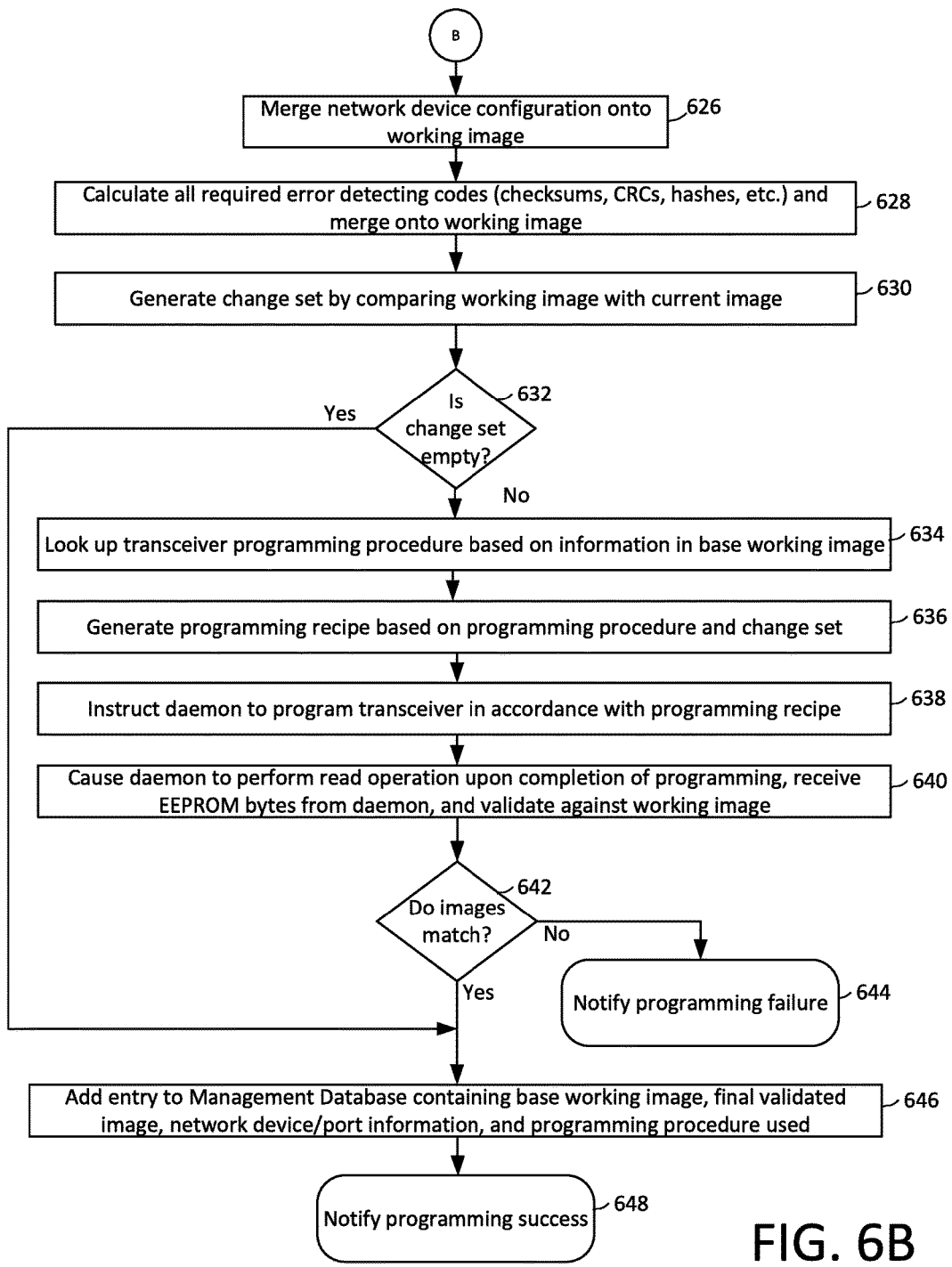

Additional details concerning the configuration process will now be described with respect to the flowchart in FIGS. 6A and 6B. This flowchart shows in greater detail the process by which the POT-CMA will determine a correct set of configuration parameters to be applied to the POT. The process begins at 602 and continues to 604 where the POT-CMA will receive the results of a read operation performed on a POT (i.e. a transceiver) installed in a network device (e.g. network device 314), in a particular port (e.g. a port 322). These results will comprise a plurality of data bytes which have been read from the EEPROM installed in the POT. These plurality of data bytes will comprise the configuration information for the POT. This information will be communicated to the POT-CMA by the daemon executing within the particular network device. Such communication will also include identifying information concerning the network device and the port. For example, the communication can specify the network device logical address information and port information.

At 605, the POT-CMA decodes all configuration information fields contained in the EEPROM bytes as the current image of the POT configuration information. Thereafter at 605 the POT-CMA will attempt to look up in the Management Database an original image comprising POT configuration information. The original image can comprise a set of configuration parameters which would have been loaded into the particular POT device as it was delivered from the manufacturer. This lookup can be performed based on the decoded fields. For example, the lookup can be based on the serial number of the POT obtained in steps 604 and 605. The device serial number is advantageously used for this purpose as it can serve as a static key that is unique to each POT.

At 608 a determination is made as to whether the Management Database contains an original image for the identified POT. If so (608: Yes), then at 612 the POT-CMA can query the Management Database to obtain the original image, which is then used as a base working image describing the configuration information for that POT. If not (608: No), then at 610 the current image obtained from the POT at 605 can be used as the base working image.

At 614 the POT-CMA deciphers the transceiver type for the POT by referring to the base working image. In this context, the transceiver type will usually comprise information specifying a particular manufacturer, model and/or part number of the POT which has been installed. In some embodiments, the transceiver type information can also specify additional characteristics of the device, such as the transmission distance capability of the device (e.g. 40 km) and/or wavelength information.

At 616 a determination is made as to whether the Configuration Database contains any information specifying modifications or additions to the transceiver type information contained in the working image. For example, certain network operators may wish to include or append transceiver wavelength information to the part number for each POT so that such information is readily available from an inspection of the part number. In other scenarios, it may be necessary to modify or add to the transceiver information so that the part will be accepted as a compatible part within certain network devices. If the transceiver type information is to be added to or modified (616: Yes), then the POT-CMA will merge at 618 the additional or modified configuration information for the identified transceiver type into the base working image.

If the configuration database does not contain any additional configuration information which should be added or modified for the particular transceiver type ((616: No) then the process continues on to 620. At this point the POT-CMA will query the Configuration Database at 620 to determine if there are any network device-specific configurations for the POT. This information can be ascertained from the Configuration Database based on known information such as transceiver type, network device type, and port location. At 622 a determination is made as to whether the Configuration Database contains any POT configuration information for the particular transceiver type when installed in the specific identified network device, and the identified port. If not (622: No), then a notification can be generated to indicate that the POT is not compatible with the identified network device. If the Configuration Database does contain the necessary POT configuration information for the specified network device, the process can continue to 626 where the POT configuration information pertaining to the particular network device and port is merged into the working image.

The process continues at 628 where the POT-CMA will calculate all required error detecting codes (checksums, CRCs, hashes, and so on). These values can be calculated based on information which is contained in the MSA and/or in the working image. Once calculated, these error detecting codes are merged onto the working image.

At 630 the system generates a change set which specifies those POT configuration parameters that need to be changed or modified. This process involves comparing the working image with the current image of the configuration information read from the POT to determine what changes need to be made. If the change set is empty (null set) then the process continues at 646. However, if changes are required (632: No) then the process continues to 634. Various POTs can have specific procedures which must be followed in order to change the configuration information contained therein. This procedure information is stored in the Configuration Database. So the POT-CMA performs a look-up in the Configuration Database to determine the proper procedure for programming the POT with new configuration information. Thereafter, at 636 a programming recipe is generated based on the specified programming procedure and the procedure (along with a write command) is communicated to the daemon at 638 so that the new configuration information is written to the newly installed POT. The programming procedure can be communicated to the daemon one step at a time, or as a set of steps to be followed to effect the required programming.

After completion of the write operation, the daemon is instructed at 640 to perform a final read operation to obtain the new configuration information which has been written to the POT, and to communicate such configuration information to the POT-CMA. Consequently, the updated configuration information in the POT is received the POT-CMA. At this point, the POT-CMA will perform a validation step by determining whether the installed configuration information matches the working image. If no match is obtained (642: No) a programming failure has occurred and a notification can be generated at 644. Assuming however, that the two images match, then the process continues to 646 where the Management Database is updated. In particular, this can involve adding an entry in the Management Database. The entry can specify information which is useful for understanding a basic configuration for the particular device, the changes which have been made to it, and the process used to effect such change. Accordingly, the entry to the Management Database can include information for each installed POT such as a base working image, a final validated image, network device/port information, and a programming procedure that was used to modify the configuration information. Upon completion of this update, a notification can be generated at 648 to indicate that the POT has been successfully programmed.

With the rise in software defined networking (SDN), the ability to manage an entire network through a centralized controller is feasible. However, the current majority of focus in SDN area is on Open Systems Interconnection (OSI) layer 2 and higher. In contrast, embodiments disclosed herein are focused on OSI layer 1 (i.e., the physical layer). The embodiments are therefore directed to an automated system process, which eliminates the need for purchasing properly configured products, as well as reducing the need for network engineers/technicians to manage utilization. Accordingly, the embodiments disclosed herein are considerably less cumbersome and are less prone to error. An SDN application as disclosed herein can automate and manage the entire POT deployment process. Further, such application can handle purchasing notifications when new parts are needed because all of the information needed to identify a suitable replacement part are contained in one central repository, accessible to the SDN application. Consequently, considerably less training/experience is required for Network Technicians in regards to POT compatibility.

It will be appreciated that the various embodiments disclosed herein will process of deploying POTs in a network by utilizing an SDN architecture in a way that it has not normally been used. This approach has the notable advantage of eliminating the possibility for errors with respect to ensuring that POTs installed in the network are properly configured. Frequently, the persons who purchasing POTs are different from the engineers that are the subject matter experts. These engineers are also different from the technicians who have responsibility for installing POTs. These three groups of people may not be co-located and in the case of installation, may be in extremely remote locations.

Accordingly, the embodiments disclosed herein employ an SDN architecture which has typically been used to dynamically control OSI layer 2 and higher functionality of a network, so as to instead provision part of the OSI layer 1 (physical layer). This approach has the advantage of keeping the knowledge and expertise in the hands of the subject matter expert and simplifying the purchasing and installation of POTs.

Several of the elements comprising an SDN 300 as described herein can comprise one or more computer processing components. Exemplary processing elements used for this purpose can include a central processing unit (CPU), an application specific circuit, a programmable logic device, or other circuit programmed to perform the functions described herein. Embodiments can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Embodiments of the inventive arrangements disclosed herein can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device.

Figure 7:
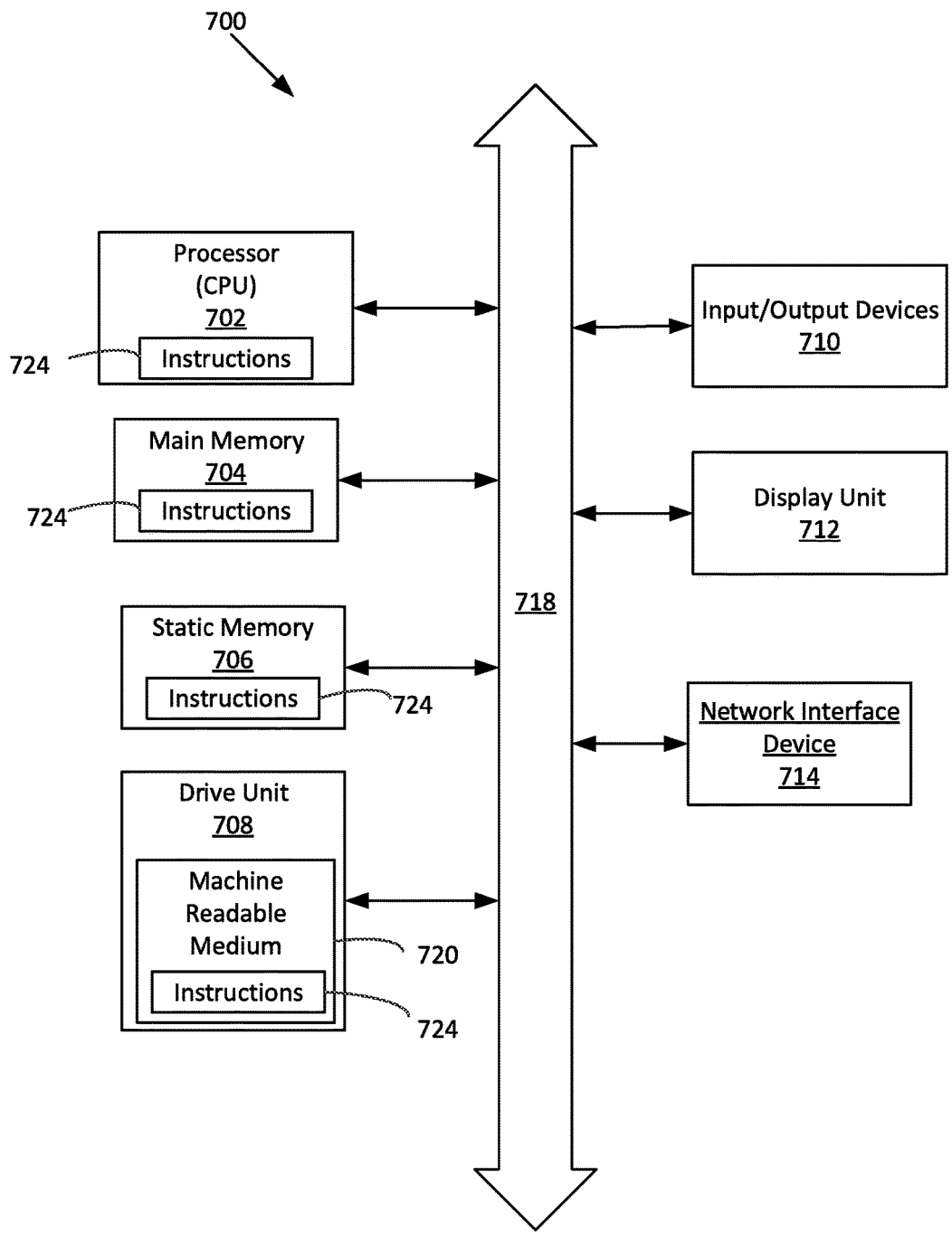
FIG. 7 is a block diagram of an exemplary computer system that can perform processing operations as described herein.

Referring now to FIG. 7, there is shown a hardware block diagram comprising an exemplary computer system 700. The machine can include a set of instructions which are used to cause the computer system to perform any one or more of the methodologies discussed herein. In a networked deployment, the machine can function as a personal computer, a server or a router. The computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions for carrying out the methods and processes described herein.

The computer system 700 is comprised of a processor 702 (e.g. a central processing unit or CPU), a main memory 704, a static memory 706, a drive unit 708 for mass data storage and comprised of machine readable media 720, input/output devices 710, a display unit 712 (e.g. a liquid crystal display (LCD), a solid state display, or a cathode ray tube (CRT)), and a network interface device 714. Communications among these various components can be facilitated by means of a data bus 718. One or more sets of instructions 724 can be stored completely or partially in one or more of the main memory 704, static memory 706, and drive unit 708. The instructions can also reside within the processor 702 during execution thereof by the computer system. The input/output devices 710 can include a keyboard, a mouse, a multi-touch surface (e.g. a touchscreen) and so on. The network interface device 714 can be comprised of hardware components and software or firmware to facilitate wired or wireless network data communications in accordance with a network communication protocol utilized by an SDN 300.

The drive unit 708 can comprise a machine readable medium 720 on which is stored one or more sets of instructions 724 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 700 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for automatically configuring a pluggable optical transceiver (POT) in a software defined network (SDN), comprising:
    executing a pluggable optical transceiver configuration management application (POT-CMA) in at least one processing device disposed in an application plane of the SDN;
    receiving at the POT-CMA data which comprises first configuration information accessed from a memory location within a POT which has been inserted into a first port of a first network device of a plurality of network devices in an SDN data plane;
    responsive to receiving the data, automatically determining at least one modification or addition to the first configuration information to facilitate use of the POT within the SDN in the first port of the first network device; and
    causing at least one write event at the first network device wherein the at least one modification or addition is written to a memory in the POT to define a second configuration information different from the first configuration information.

2. The method according to claim 1, wherein the second configuration information is utilized by the POT in place of the first configuration information when the POT is operated in the first port of the first network device.

3. The method according to claim 1, wherein the data comprising the first configuration information is obtained in a read event which occurs at the first network device after the POT has been inserted in the first port.

4. The method according to claim 3, wherein the read event and the write event are performed under the control of a daemon executing at the first network device.

5. The method according to claim 3, wherein the read event and a communication of the data to the POT-CMA occur automatically in response to a detected insertion of the POT into the first port of the first network device.

6. The method according to claim 1, wherein the first configuration information involves at least one type of information selected from the group consisting of operational configuration data, operational alarm/warning thresholds, vendor general information and vendor specific information.

7. The method according to claim 6, wherein the POT-CMA accesses a configuration database to determine the at least one modification or addition to the first configuration information.

8. The method according to claim 7, wherein each of the plurality of network devices includes at least one port into which a POT can be inserted, and the configuration database contents are selected to include correct POT configuration information for the at least one port in each of the plurality of network devices.

9. The method according to claim 1, further comprising determining a programming procedure for the POT from among a plurality of programming procedures to facilitate the at least one write event, and causing the write event to proceed at the first network device in accordance with the programming procedure.

10. The method according to claim 1, further comprising storing at least the second configuration information in a management database which is accessible to a network administrator.

11. The method according to claim 1, further comprising receiving at the POT-CMA the first configuration information which has been accessed from the memory location, through an SDN controller disposed in a controller plane of the SDN network.

12. A software defined network (SDN), comprising:
- at least one processing device disposed in an application plane of the network and executing a pluggable optical transceiver configuration management application (POT-CMA);
- a SDN controller disposed in a controller plane of the SDN network;
- a SDN data plane comprised of a plurality of network devices, each facilitating optical communications in the SDN using at least one pluggable optical transceiver (POT);
- wherein said at least one processing device is configured to:
- receive from the SDN controller data comprising first configuration information accessed from an internal memory of a POT, which has been inserted into a first port of a first network device of the plurality of network devices;
- responsive to receiving the data, automatically determine at least one modification or addition to the first configuration information to facilitate use of the POT in the first network device; and
- cause at least one write event at the first network device wherein the at least one modification or addition is written to a memory in the POT to define a second configuration information different from the first configuration information.

13. The SDN according to claim 12, wherein the POT is configured to utilize the second configuration information in place of the first configuration information when the POT is operated in the first port of the first network device.

14. The SDN according to claim 12, wherein the data comprising the first configuration information is obtained in a read event which occurs at the first network device after the POT has been inserted in the first port.

15. The SDN according to claim 14, further comprising a daemon executing at the first network device and configured to control the read event and the at least one write event.

16. The SDN according to claim 15, wherein the daemon is configured to perform the read event and a communication of the data to the POT-CMA automatically in response to a detected insertion of the POT into the first port of the first network device.

17. The SDN according to claim 12, wherein the first configuration information comprises at least one type of information selected from the group consisting of operational configuration data, operational alarm/warning thresholds, vendor general information and vendor specific information.

18. The SDN according to claim 17, further comprising a configuration database in a data storage device accessible to the POT-CMA, wherein the POT-CMA is configured to access the configuration database to determine the at least one modification or addition to the first configuration information.

19. The SDN according to claim 18, wherein each of the plurality of network devices includes at least one port into which a POT can be inserted, and the configuration database contents comprises correct POT configuration information for the at least one port in each of the plurality of network devices.

20. The SDN according to claim 12, further wherein the POT-CMA is configured to determine a programming procedure for the POT from among a plurality of programming procedures to facilitate the at least one write event, and for causing the write event to proceed at the first network device in accordance with the programming procedure.

21. The SDN according to claim 12, further comprising a management database in a data storage device accessible to the POT-CMA, wherein the POT-CMA is configured to cause at least the second configuration information to be stored in the management database which is accessible to a network administrator.

22. The SDN according to claim 12, wherein the POT-CMA is configured to receive the first configuration information which has been accessed from the memory location, through an SDN controller disposed in a controller plane of the SDN network.

* * * * *